July 14, 1959 — E. S. GRIEBE — 2,894,268
FLOAT-SUPPORTED SEA TERMINAL
Filed Dec. 27, 1956 — 2 Sheets-Sheet 1

INVENTOR
*Erwin S. Griebe*
BY
*Curtis Morris & Safford*
ATTORNEYS

July 14, 1959
E. S. GRIEBE
2,894,268
FLOAT-SUPPORTED SEA TERMINAL
Filed Dec. 27, 1956
2 Sheets-Sheet 2
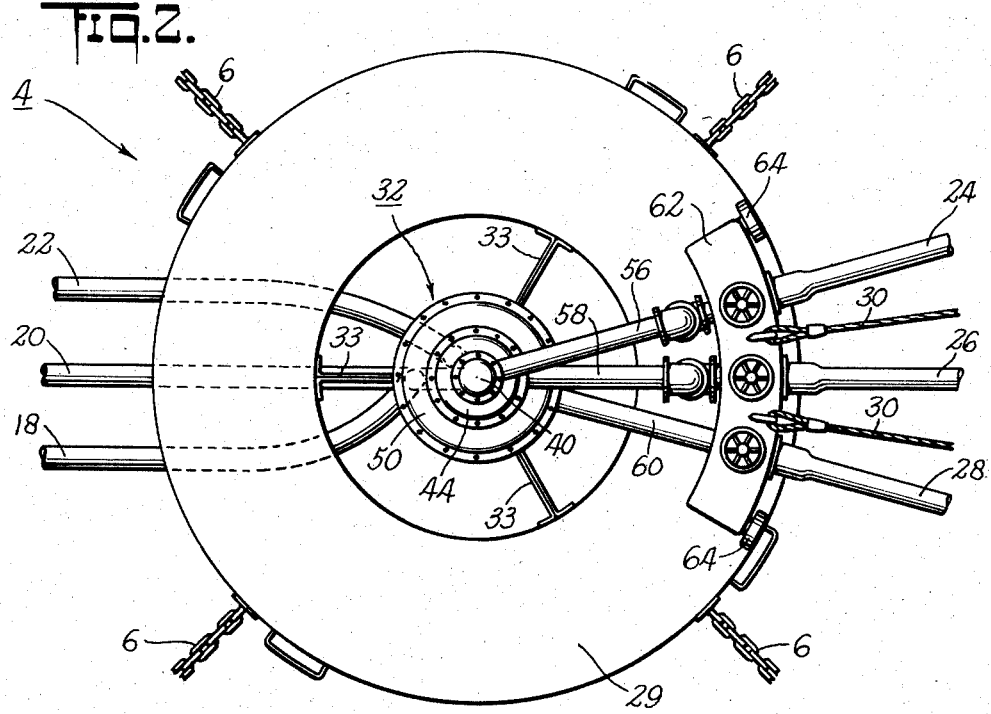
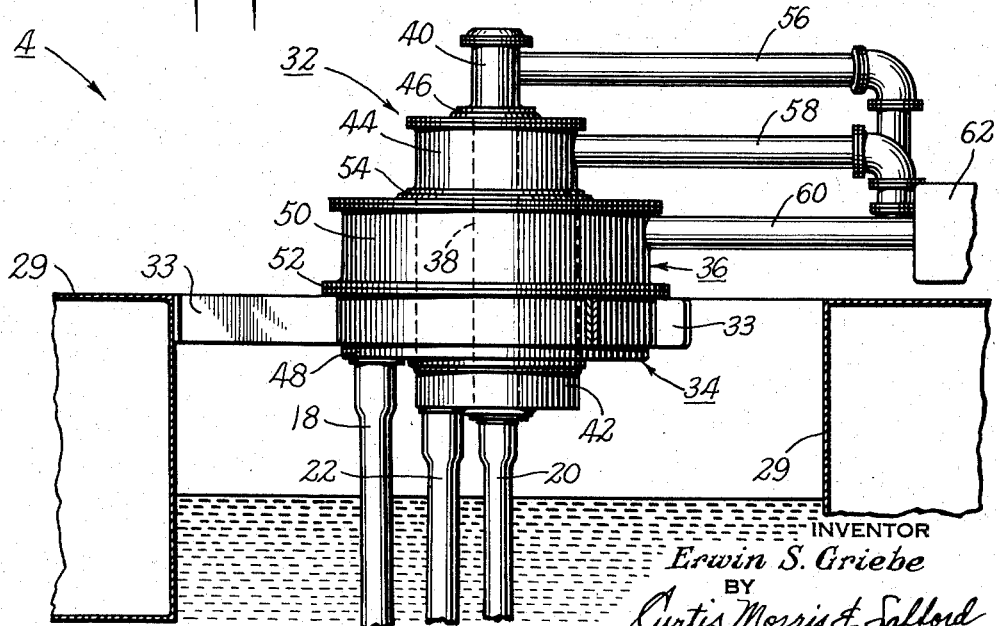
INVENTOR
Erwin S. Griebe
BY
Curtis Morris & Safford
ATTORNEYS

United States Patent Office 2,894,268
Patented July 14, 1959

2,894,268
FLOAT-SUPPORTED SEA TERMINAL
Erwin S. Griebe, Dover, N.J.

Application December 27, 1956, Serial No. 630,981

7 Claims. (Cl. 9—8)

This invention relates to loading and unloading ships, and more in particular to a method, a system and apparatus for loading and unloading liquids from oil tankers and other sea-going vessels, and providing for the handling of the product or cargo, and also the simultaneous handling of fresh water and fuel oil for the vessel. The invention also relates to particular equipment and facilities for use in connection with the above-mentioned operations.

An object of this invention is to provide an improved arrangement for loading and unloading ships and other vessels. A further object is to provide apparatus for facilitating the loading and unloading of ships carrying fluids such as raw petroleum. A further object is to provide sea terminal stations for ships whereby they may be loaded and unloaded without the necessity for providing coastal stations. A further object is to provide a thoroughly practical and efficient loading and unloading facility for ships while located remote from the shore. A further object is to provide apparatus and equipment for carrying out the above in an efficient and dependable manner. A still further object is to provide for the above in a manner so as to avoid the difficulties which have been encountered with methods and systems which have been available in the past to accomplish the same general purposes. A further object is to provide for the above with arrangements and equipment which is adaptable to many conditions which are encountered in installation and use. These and other objects will be in part obvious and in part pointed out below.

In the drawings:

Figure 2 is a top-plan view of the float of Figure 1; and,

Figure 3 is an enlarged view with parts shown in section of the central portion of Figure 1.

Figure 1:
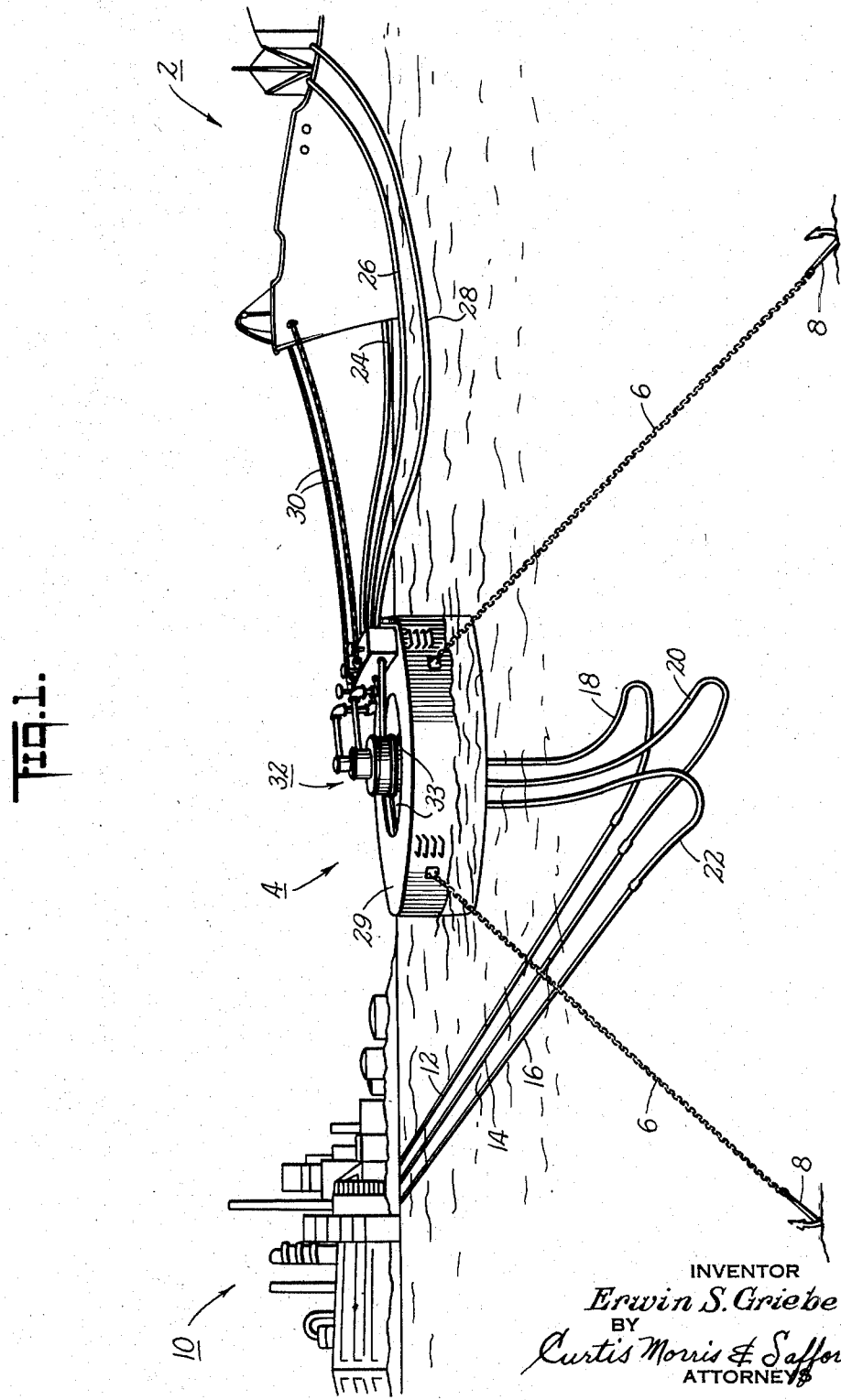
Figure 1 is a somewhat diagrammatic representation of one embodiment of the invention.

In the past, there has been considerable need for improved loading and unloading facilities, particularly for ships carrying fluids such as crude petroleum. The loading and unloading of such ships from docks produces certain hazards to safety, not only because the spilled oil creates a fire hazard, but also because the dock facilities accommodate two or more ships simultaneously, and the land storage stations are apt to be located nearby. This means that any fire may quickly spread to all of the ships, and also to the land facilities. Where dock facilities are provided in protected areas there may still be difficulty in bad weather during approach or departure of an unloaded or partially loaded ship; and, this may make it necessary to carry ballast to or from the dock when ballast might not otherwise be used.

Mooring stations have been proposed and provided at points remote from the shore, but those which have been provided have been unsatisfactory during bad weather, as well as under other conditions of operation. In fact, with some such facilities, it has been necessary at times to cut or loose the lines suddenly to prevent damage to the fuel cargo lines when there was a sudden change in weather conditions. Also, it has been generally accepted that such off-shore mooring lines could be used only during daylight hours because of the extreme hazards which have been involved.

Another very serious problem which has been encountered in the past has been to provide emergency dock facilities in crowded harbors, or during war time, or even to load petroleum from a new or temporary oil field or terminal pipe line. The building of docks and the dredging of harbors are time consuming and costly operations. Hence, there are times when the previously available off-shore loading facilities have been provided and, as indicated above, these have proven to be unsatisfactory. It is an object of the present invention to provide thoroughly satisfactory off-shore loading and unloading facilities which avoid the difficulties referred to above.

Referring to Figure 1 of the drawings, a ship 2 is shown moored to a loading and unloading terminal 4 which is anchored by four chains 6 having anchors 8 at their ends. An on-shore refinery 10 is illustrated to which petroleum is being delivered through a pipe line 12 from the ship 2. Additional lines 14 and 16 are provided through which fuel oil and water, respectively, are supplied to the ship. Each of these lines 12, 14 and 16 terminates at the terminal 4, and these lines are connected to this terminal by flexible lines 18, 20 and 22, respectively. Terminal 4 provides a connection from these flexible lines 18, 20 and 22, respectively, to a set of flexible lines 24, 26 and 28 which extend to the ship. Lines 24, 26 and 28 are secured to the ship during a loading or unloading operation, and the ship is also connected to the terminal by a pair of anchor lines 30. As will be explained below, the lines attached to the ship may swing freely about the terminal without undue strain upon the lines.

Terminal 4 is formed by a relatively stationary annular float 29 which is compartmentalized, and which has a rigid frame to which the other parts are fixed. The float is formed of heavy-gauge steel and is appropriately treated and coated to be resistant to the action of the water. The interconnection between the set of lines 18, 20 and 22, and the set of lines 24, 26 and 28 is provided through a swivel header assembly 32 which is supported by radial frame members or arms 33. Header assembly 32 has a lower section 34 rigidly mounted upon the frame of the terminal 4, and an upper section 36 which is a rotatable swivel portion and is mounted upon the lower portion 34 through fluid-tight swivel joints or seals.

The structure of the swivel header assembly 32 is best shown in Figure 3. The flexible line 20 is connected to the lower end of a stationary pipe 38, the top of which is closed by a swivel head 40. Rigidly attached to the radial frame members 33 and surrounding pipe 38 is a stationary cylindrical casing 42 which has its upper end closed by a rotatable header 44. A swivel seal or joint 46 is provided between the bottom of header 40 and the top of pipe 38, and also between each of these and a concentric opening in the top of header 44. The bottom end of casing 42 is closed except for a connection to the stationary flexible line 22. Surrounding the lower end of casing 42 is a stationary concentric casing 48 to which the flexible petroleum line 18 is connected. Mounted by a swivel joint 52 upon the top of the stationary casing 48 is a rotary or swivel header 50 which is held at the top by a swivel joint 54 which also provides a swivel joint between the swivel header 44 and its mating stationary casing 42.

Extending respectively from the headers 40, 44 and 50 are three rigid pipes or lines 56, 58 and 60 which extend as shown (see also Figure 2) to a rotatably connecting box 62. Box 62 is rectangular in cross section, but extends arcuately along the periphery of float 29. The box is provided with rollers 64 which ride upon the top of float 29, so that the box is supported by the rollers and can turn freely around the float. Each of the pipes 56, 58 and 60 is rigidly connected to the box, and is provided with a cut-off valve and a connection to the respective one of the lines 24, 26 and 28. Hence, the connecting box may move around the periphery of the float and, when it does, it carries with it the various pipes 56, 58 and 60. Each of these pipes is rigidly mounted in its header so that the entire rotary header assembly is rotated as the connecting box moves. It is thus seen that a rotary connection is provided between each of the lines 18, 20 and 22 through the stationary portion of the header assembly and thence from the rotary portion of the header assembly to the valve connection in the connecting box. Therefore, when the ship is connected to the terminal for loading or unloading and it swings around the terminal, the connecting box moves with it. However, this movement causes only a turning of the rotary portion of the swivel header assembly, and the connections with the stationary lines extending from the shore are undisturbed.

The flexible lines 18, 20 and 22 permit the rise and fall with the tides and it may rock and roll without causing any difficulty. When a loading or unloading operation has been completed, the lines 24, 26 and 28 are disconnected from the ship and are rolled and fastened upon the top of the float, and the connecting box 62 is blocked so that it cannot turn. The lines 30 from the ship are then disconnected.

In this embodiment of the invention, the entire swivel header assembly 32 is mounted above the water line within the cylindrical space at the center of the float. The fixed connections with lines 18, 20 and 22 are therefore above the water line. While the float herein disclosed is annular, many advantages of the invention may be obtained by other types of float, such as, a triangular float. However, the annular float permits the connections to extend directly downwardly from the center of the float, and has very special advantages. The invention contemplates using terminals of this character for various liquids and also for such bulk products as can be conveyed by pneumatic conveying systems. A marine terminal of this character may be moved from place to place, and the installation involves only the anchoring of the terminal and the laying of a line or lines to the shore.

I claim:

1. In a marine terminal, the combination of, an annular float, a connecting box mounted upon the top of said float and adapted to move therearound, a relatively stationary header assembly fixed to said float at the central portion thereof, a swivel header assembly mounted upon said relatively stationary header assembly and adapted to swivel thereon, said header assemblies providing a plurality of separate passageways each from a stationary connection to a swiveling connection, means connecting each passageway of said swiveling connection to said connecting box, and anchor means for said float.

2. Apparatus as described in claim 1 which includes, means for mechanically connecting said connecting box to a ship, and a plurality of lines respectively connecting each of said swivel connections to the ship.

3. Apparatus as described in claim 2, wherein said connecting box is an arcuate structure which includes means supporting it at the periphery of the float and which is pivotally supported by the swivel header assembly through said lines.

4. Apparatus as described in claim 1 which includes, rollers providing support for said connecting box at the periphery of said float, a plurality of lines respectively connecting each of said swivel connections to the ship and providing pivotal support for said connecting box, and means for mechanically connecting said connecting box to the ship.

5. Apparatus as described in claim 1, which includes a rigid spider structure with radial arms supporting said swivel header assembly at the center of said float.

6. Apparatus as described in claim 1, wherein said swivel header assembly comprises a plurality of stationary concentric cylindrical wall structures and a corresponding number of mating swivel headers mounted thereon and interconnected with each other by sliding seals, and line connecting means providing separate connections to the respective chambers in said concentric cylinders.

7. Apparatus as described in claim 6, which includes valves in said connecting box to open and close said lines.

References Cited in the file of this patent

UNITED STATES PATENTS

| 2,701,375 | Ault | Feb. 8, 1955 |
| 2,748,739 | Monti | June 5, 1956 |
| 2,771,617 | Brackx | Nov. 27, 1956 |

FOREIGN PATENTS

| 109,992 | Sweden | Mar. 7, 1944 |